United States Patent
Fulkerson

(10) Patent No.: US 11,439,273 B2
(45) Date of Patent: Sep. 13, 2022

(54) ADJUSTABLE GRILL COVER ASSEMBLY

(71) Applicant: Ryan Fulkerson, Castaic, CA (US)

(72) Inventor: Ryan Fulkerson, Castaic, CA (US)

(*) Notice: Subject to any disclaimer, the term of this patent is extended or adjusted under 35 U.S.C. 154(b) by 302 days.

(21) Appl. No.: 16/835,507

(22) Filed: Mar. 31, 2020

(65) Prior Publication Data
US 2021/0298523 A1 Sep. 30, 2021

(51) Int. Cl.
*A47J 37/06* (2006.01)
(52) U.S. Cl.
CPC ............... *A47J 37/0664* (2013.01)
(58) Field of Classification Search
CPC .................................. A47J 37/0664
USPC .......................................... 126/25 R
See application file for complete search history.

(56) References Cited

U.S. PATENT DOCUMENTS

| | | | |
|---|---|---|---|
| 4,285,354 A * | 8/1981 | Beavers | E04H 15/30 135/900 |
| 6,058,658 A | 5/2000 | Dunn | |
| 6,506,471 B2 | 1/2003 | Dopplet | |
| 7,152,733 B2 * | 12/2006 | Trickett | A47J 37/0786 206/320 |
| 8,069,871 B2 * | 12/2011 | Schneider | E04H 15/16 135/117 |
| 9,596,958 B1 * | 3/2017 | Murphy | A47J 37/0786 |
| D819,368 S | 6/2018 | Zemel | |
| 11,002,035 B1 * | 5/2021 | Wells | E04H 15/32 |
| 2002/0179211 A1 * | 12/2002 | Neal | A47J 37/0786 150/154 |
| 2005/0066957 A1 | 3/2005 | MacLean | |
| 2009/0101256 A1 * | 4/2009 | Maruzzo | A47J 37/0786 150/165 |
| 2012/0097203 A1 | 4/2012 | Young | |
| 2018/0242787 A1 * | 8/2018 | Atalla | B60J 11/04 |

\* cited by examiner

*Primary Examiner* — Avinash A Savani

(57) ABSTRACT

An adjustable grill cover assembly includes a cover that has an upper portion, a lower portion and a medial portion extending between the upper portion and the lower portion. The cover is positionable over a cooking grill to protect the cooking grill from the elements. The cover is positionable in a shortened position to cover only a top portion of the cooking grill. Conversely, the cover is positionable in a lengthened position to cover a full height of the cooking grill. A set of first mating members is each coupled to the upper portion of the cover. A set of second mating members is each coupled to the lower portion of the cover. Each of the second mating members releasably engages a respective one of the first mating members to retain the cover in the shortened position.

6 Claims, 7 Drawing Sheets

ADJUSTABLE GRILL COVER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to cover devices and more particularly pertains to a new cover device for protecting a cooking grill from the elements.

(2) Description of Related Art Including Information Disclosed Under 37 CFR 1.97 and 1.98

The prior art relates to cover devices. The prior art discloses a cooking grill cover that includes a narrow portion and a wide portion for accommodating a lid and a pair of wings on a cooking grill. The prior art discloses a cooking grill cover that comprises a textile outer surface and a metallic inner surface. The prior art also discloses a cooking grill cover that includes a flexible frame and a shroud. Additionally, the prior art discloses a cooking grill cover that includes a pair of flaps that can be buttoned together when the cooking grill cover is positioned over a cooking grill.

BRIEF SUMMARY OF THE INVENTION

An embodiment of the disclosure meets the needs presented above by generally comprising a cover that has an upper portion, a lower portion and a medial portion extending between the upper portion and the lower portion. The cover is positionable over a cooking grill to protect the cooking grill from the elements. The cover is positionable in a shortened position to cover only a top portion of the cooking grill. Conversely, the cover is positionable in a lengthened position to cover a full height of the cooking grill. A set of first mating members is each coupled to the upper portion of the cover. A set of second mating members is each coupled to the lower portion of the cover. Each of the second mating members releasably engages a respective one of the first mating members to retain the cover in the shortened position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
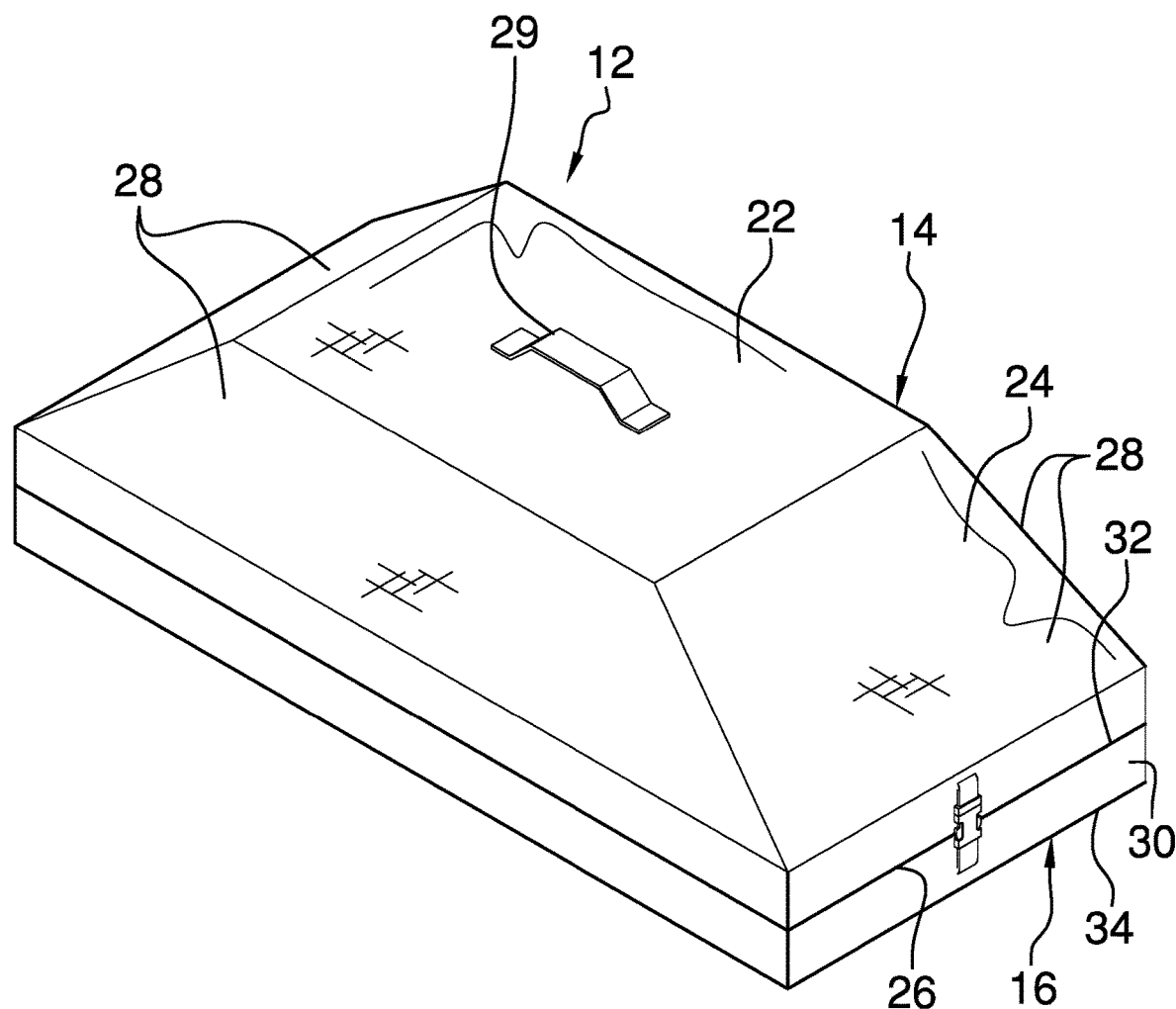
FIG. 1 is a top perspective view of an adjustable grill cover assembly according to an embodiment of the disclosure showing a cover being positioned in a shortened position.
Figure 2:
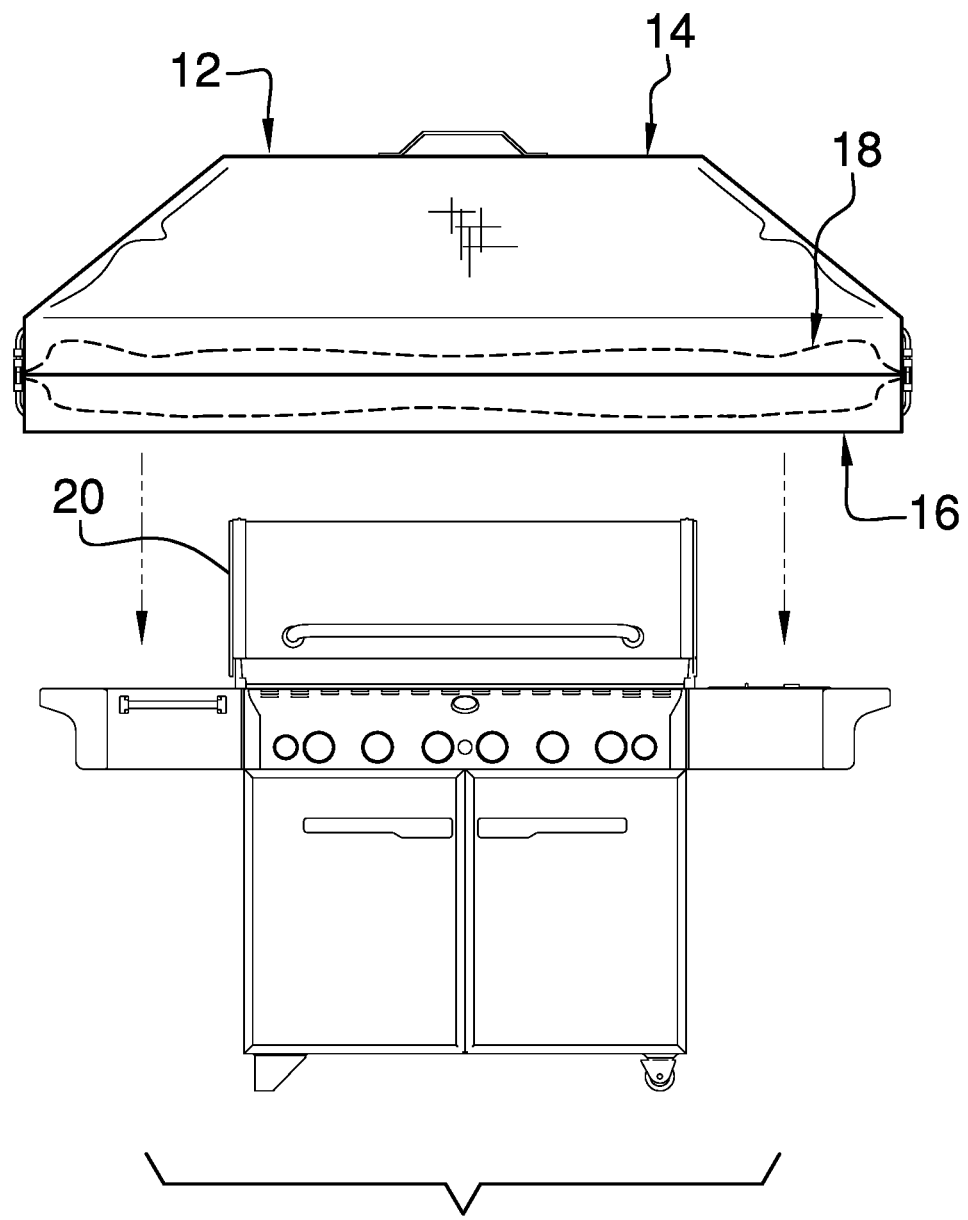
FIG. 2 is a perspective in-use view of an embodiment of the disclosure.
Figure 3:
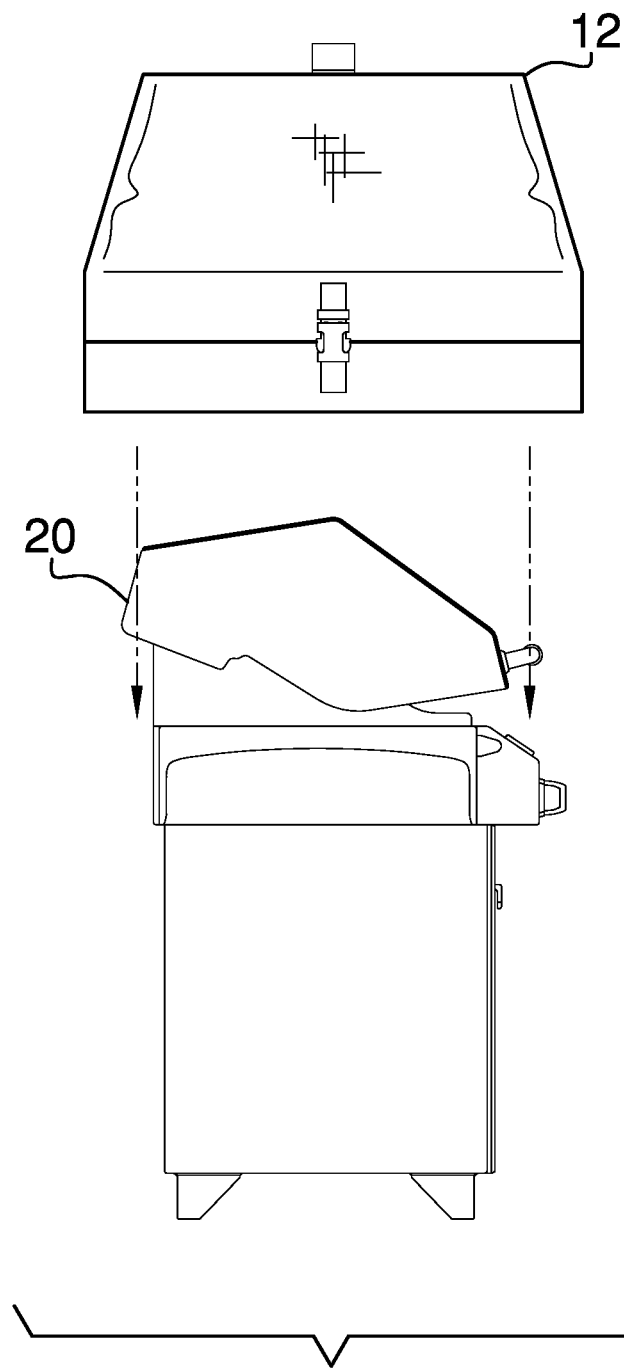
FIG. 3 is a right side in-use view of an embodiment of the disclosure.
Figure 4:
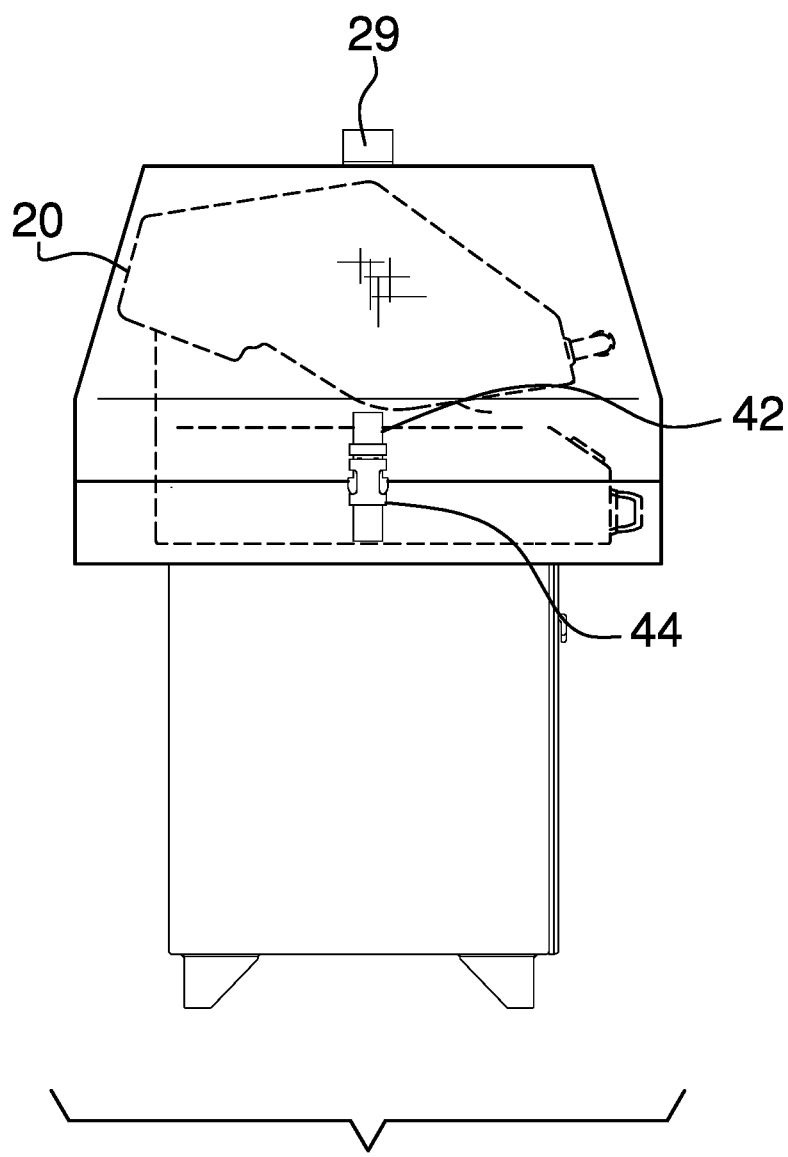
FIG. 4 is a right side phantom view of an embodiment of the disclosure being positioned on a cooking grill.
Figure 5:
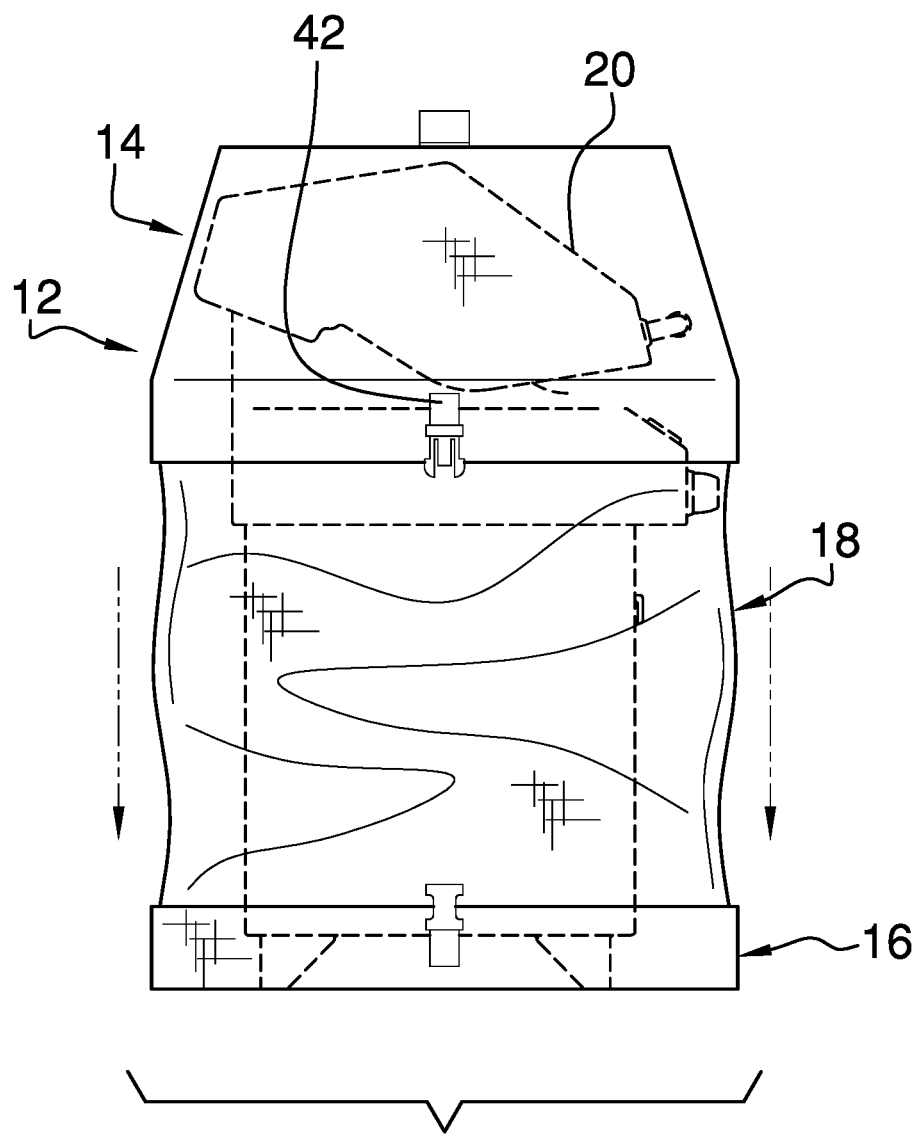
FIG. 5 is a right side phantom view of an embodiment of the disclosure showing a cover being positioned in an elongated position.
Figure 6:
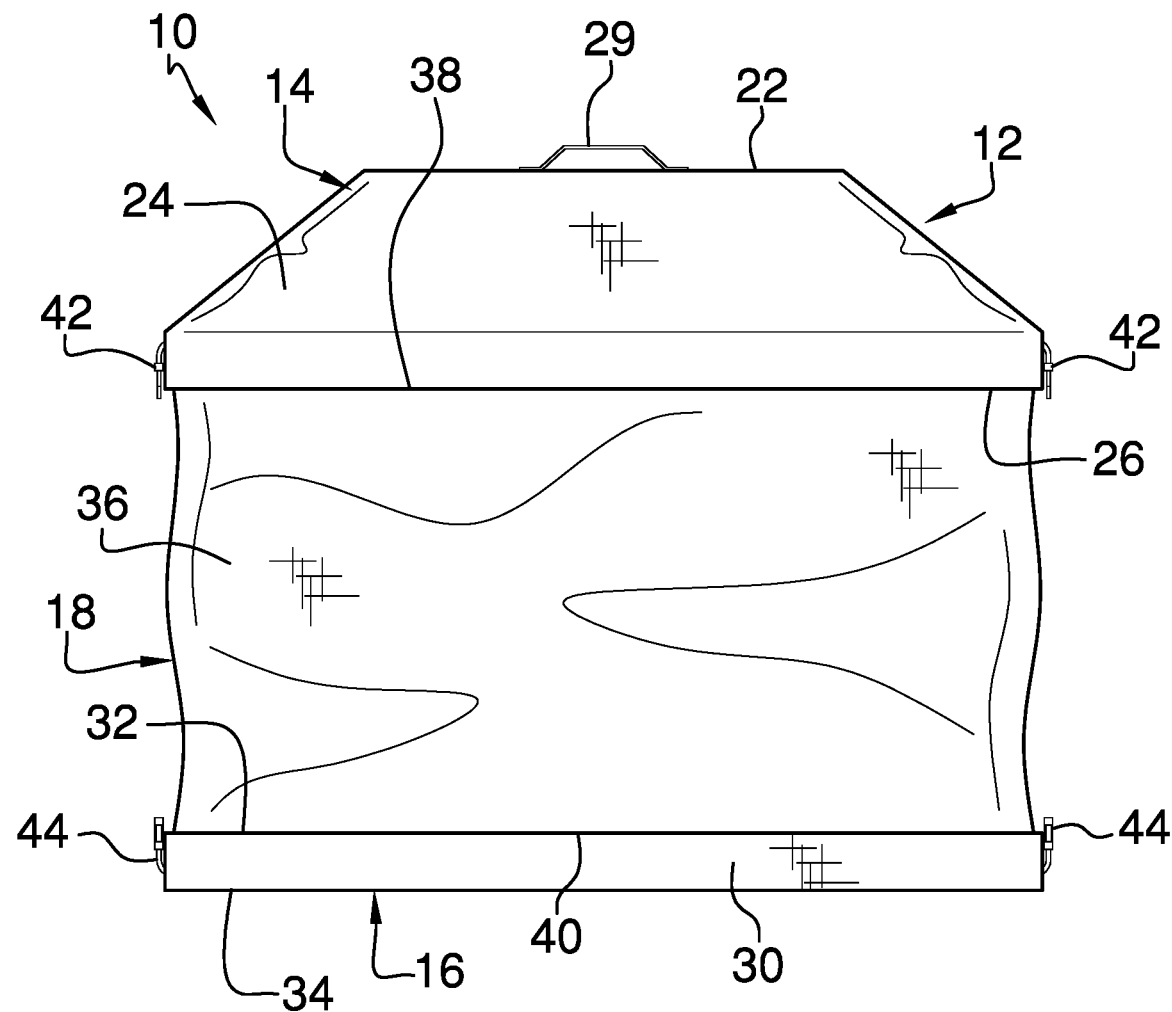
FIG. 6 is a front view of an embodiment of the disclosure showing a cover being positioned in an elongated position.
Figure 7:
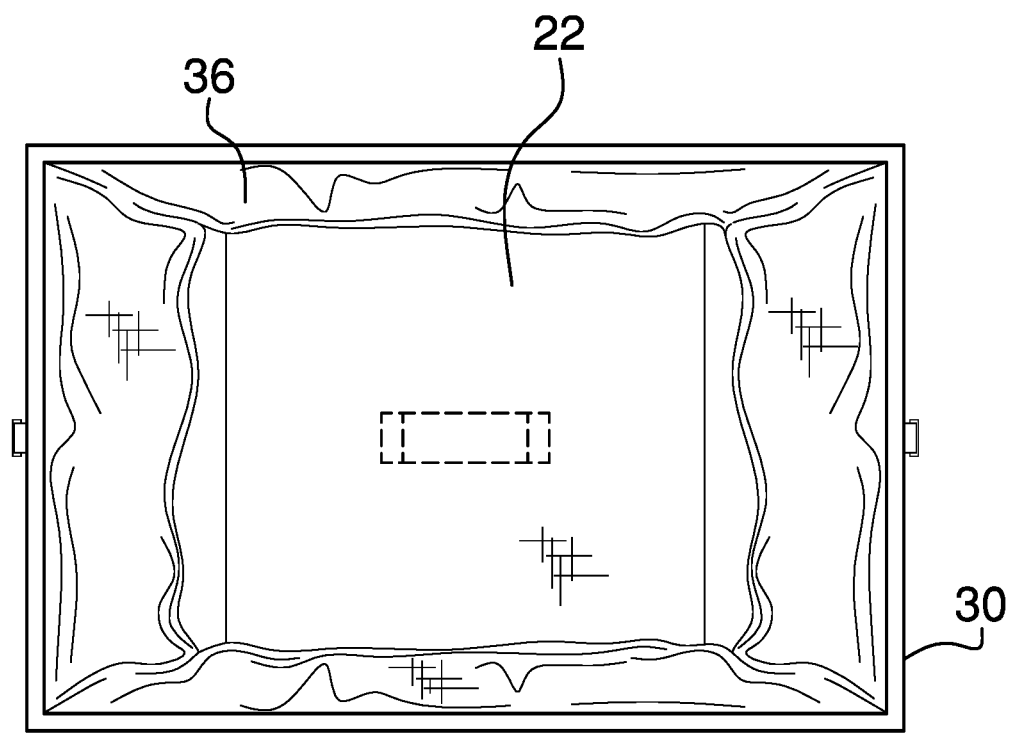
FIG. 7 is a bottom phantom view of an embodiment of the disclosure.

With reference now to the drawings, and in particular to FIGS. 1 through 7 thereof, a new cover device embodying the principles and concepts of an embodiment of the disclosure and generally designated by the reference numeral 10 will be described.

As best illustrated in FIGS. 1 through 7, the adjustable grill cover assembly 10 generally comprises a cover 12 that has an upper portion 14, a lower portion 16 and a medial portion 18 extending between the upper portion 14 and the lower portion 16. The cover 12 is positionable over a cooking grill 20 to protect the cooking grill 20 from the elements. The cover 12 is positionable in a shortened position to cover 12 only a top portion of the cooking grill 20. Moreover, the cover 12 is positionable in a lengthened position to cover 12 a full height of the cooking grill 20. The cover 12 may be comprised of a heat resistant material such that the cover 12 resists being damaged by heat from the cooking grill 20. Additionally, the cover 12 may be comprised of a fluid impermeable material to protect the cooking grill 20 from precipitation.

The upper portion 14 has top wall 22 and an outer wall 24 extending downwardly therefrom. The outer wall 24 has a distal edge 26 with respect to the top wall 22 and the outer wall 24 has a plurality of intersecting sides 28. Each of the intersecting sides 28 angles outwardly between the top wall 22 and the distal edge 26 such that the upper portion 14 has a trapezoidal shape. In this way the upper portion 14 can conform to the shape of a lid on the cooking grill 20. A handle 29 is coupled to the top wall 22 to facilitate the cover 12 to be carried.

The lower portion 16 has an outside wall 30 and the outside wall 30 has a top edge 32 and a bottom edge 34. The top edge 32 abuts the distal edge 26 of the outer wall 24 of the upper portion 14 when the cover 12 is positioned in the shortened position. The medial portion 18 has an exterior wall 36 and the exterior wall 36 has an upper edge 38 and a lower edge 40. The upper edge 38 is coupled to and is coextensive with the distal edge 26 of the outer wall 24 of the upper portion 14. Additionally, the lower edge 40 is coupled to the top edge 32 of the outside wall 30 of the lower portion 16. The medial portion 18 is collapsed when the cover 12 is positioned in the shortened position. Conversely, the medial portion 18 is elongated between the upper portion 14 and the lower portion 16 when the cover 12 is positioned in the elongated position.

A set of first mating members 42 is provided and each of the first mating members 42 is coupled to the upper portion 14 of the cover 12. Each of the first mating members 42 is positioned on the outer wall 24 of the upper portion 14 and each of the first mating members 42 is aligned with the distal edge 26 of the outer wall 24. The first mating members 42 are positioned on opposite sides of the outer wall 24 with respect to each other. Each of the first mating members 42 may comprise, but be limited to, a clip, a hook and loop fastener, a snap or any other type of releasable fastener.

A set of second mating members 44 is provided and each of the second mating members 44 is coupled to the lower portion 16 of the cover 12. Each of the second mating members 44 releasably engages a respective one of the first mating members 42 to retain the cover 12 in the shortened position. Each of the second mating members 44 is releasable from the respective first mating member 42 to facilitate the cover 12 to be positioned in the elongated position. Each of the second mating members 44 is positioned on the outside wall 30 of the lower portion 16 and the second mating members 44 is positioned on opposite sides of the outside wall 30 with respect to each other. Additionally, each of the second mating members 44 is aligned with the respective first mating member 42. Each of the second mating members 44 may comprise, but be limited to, a clip, a hook and loop fastener, a snap or any other type of releasable fastener.

In use, the cover 12 is positioned in the collapsed position and the cover 12 is positioned over the cooking grill 20. Each of the second mating members 44 is uncoupled from the respective first mating members 42 to position the cover 12 in the extended position. In this way the cover 12 can conceal the full height of the cooking grill 20. The cover 12 can be positioned in the shortened position and each of the first mating members 42 is coupled to the respective second mating member. In this way the cover 12 is retained in the shortened position to make it easier to remove the cover 12 from the cooking grill 20.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adjustable grill cover assembly having an adjustable length for enhancing removing said assembly from a grill, said assembly comprising:

a cover having an upper portion, a lower portion and a medial portion extending between said upper portion and said lower portion, said cover being positionable over a cooking grill wherein said cover is configured to protect the cooking grill from the elements, said cover being positionable in a shortened position wherein said cover is configured to cover only a top portion of the cooking grill, said cover being positionable in a lengthened position wherein said cover is configured to cover a full height of the cooking grill, wherein said upper portion has top wall and an outer wall extending downwardly therefrom, said outer wall having a distal edge with respect to said top wall, said outer wall having a plurality of intersecting sides, each of said intersecting sides angling outwardly between said top wall and said distal edge such that said upper portion has a trapezoidal shape wherein said upper portion is configured to conform to the shape of a lid on the cooking grill, wherein said lower portion has an outside wall, said outside wall having a top edge and a bottom edge, said top edge abutting said distal edge of said outer wall of said upper portion when said cover is positioned in said shortened position;

a set of first mating members, each of said first mating members being coupled to said upper portion of said cover; and a set of second mating members, each of said second mating members being coupled to said lower portion of said cover, each of said second mating members releasably engaging a respective one of said first mating members to retain said cover in said shortened position, each of said second mating members being releasable from said respective first mating member to facilitate said cover to be positioned in said elongated position.

2. The assembly according to claim 1, wherein said medial portion has an exterior wall, said exterior wall having an upper edge and a lower edge, said upper edge being coupled to and being coextensive with said distal edge of said outer wall of said upper portion, said lower edge being coupled to said top edge of said outside wall of said lower portion.

3. The assembly according to claim 1, wherein said medial portion is collapsed when said cover is positioned in said shortened position, said medial portion being elongated between said upper portion and said lower portion when said cover is positioned in said elongated position.

4. The assembly according to claim 1, wherein each of said first mating members is positioned on said outer wall of said upper portion, each of said first mating members being aligned with said distal edge of said outer wall, said first mating members being positioned on opposite sides of said outer wall with respect to each other.

5. The assembly according to claim 1, wherein each of said second mating members is positioned on said outside wall of said lower portion, said second mating members being positioned on opposite sides of said outside wall with respect to each other, each of said second mating members being aligned with said respective first mating member.

6. An adjustable grill cover assembly having an adjustable length for enhancing removing said assembly from a grill, said assembly comprising:

a cover having an upper portion, a lower portion and a medial portion extending between said upper portion and said lower portion, said cover being positionable over a cooking grill wherein said cover is configured to protect the cooking grill from the elements, said cover being positionable in a shortened position wherein said cover is configured to cover only a top portion of the cooking grill, said cover being positionable in a lengthened position wherein said cover is configured to cover a full height of the cooking grill, said upper portion having top wall and an outer wall extending downwardly therefrom, said outer wall having a distal edge with respect to said top wall, said outer wall having a plurality of intersecting sides, each of said intersecting sides angling outwardly, between said top wall and said distal edge such that said upper portion has a trapezoidal shape wherein said upper portion is configured to conform to the shape of a lid on the cooking grill, said lower portion having an outside wall, said outside wall having a top edge and a bottom edge, said top edge abutting said distal edge of said outer wall of said upper portion when said cover is positioned in said shortened position, said medial portion having an exterior wall, said exterior wall having an upper edge and a lower edge, said upper edge being coupled to and being coextensive with said distal edge of said outer wall of said upper portion, said lower edge being coupled to said top edge of said outside wall of said lower portion, said medial portion being collapsed when said cover is positioned in said shortened position, said medial portion being elongated between said upper portion and said lower portion when said cover is positioned in said elongated position;

a set of first mating members, each of said first mating members being coupled to said upper portion of said cover, each of said first mating members being positioned on said outer wall of said upper portion, each of said first mating members being aligned with said distal edge of said outer wall, said first mating members being positioned on opposite sides of said outer wall with respect to each other; and a set of second mating members, each of said second mating members being coupled to said lower portion of said cover, each of said second mating members releasably engaging a respective one of said first mating members to retain said cover in said shortened position, each of said second mating members being releasable from said respective first mating member to facilitate said cover to be positioned in said elongated position, each of said second mating members being positioned on said outside wall of said lower portion, said second mating members being positioned on opposite sides of said outside wall with respect to each other, each of said second mating members being aligned with said respective first mating member.

* * * * *